United States Patent Office 2,933,535
Patented Apr. 19, 1960

2,933,535

VAPOR PHASE PRODUCTION OF HALONITROETHANES

Gustave B. Bachman, West Lafayette, Ind., and Ted J. Logan, Cincinnati, Ohio, assignors to Purdue Research Foundation, West Lafayette, Ind., a corporation of Indiana No Drawing. Application June 20, 1958
Serial No. 743,505

8 Claims. (Cl. 260—644)

Our invention pertains to the production of halonitroethanes having at least one halogen beta to the carbon carrying the nitro radical by the halonitration of haloethylenes and more particularly to the production of halonitroethanes by the vapor phase halonitration of haloethylenes by dinitrogen tetroxide and halogens.

Unsubstituted olefins have previously been shown to react with mixtures of halogen and dinitrogen tetroxide to form the corresponding beta-haloalkyl nitrates (G. B. Bachman and T. J. Logan, J. Org. Chem., 21, 1467 (1956). In co-pending application, Serial No. 743,494, filed June 20, 1958, we have disclosed the production of halonitroethanes having at least one halogen beta to the carbon carrying the nitro radical by the liquid phase halonitration of haloethylenes with dinitrogen tetroxide and halogens. We have now discovered that by carrying out the halonitration of haloethylenes in the vapor phase, the halonitration takes place in a different manner so as to produce compounds differing in structure from those produced by the liquid phase halonitration of the haloethylenes. Our process, therefore, permits the production of any desired isomer of the halonitroethanes merely by regulating the reaction conditions under which the halonitration of the haloethylenes takes place.

Our process for the production of halonitroethanes having at least one halogen beta to the carbon carrying the nitro radical consists essentially of contacting in the vapor phase a mixture of dinitrogen tetroxide, halogen, and haloethylene, the nitrating and the halogenating agents being preferably first mixed and the resulting mixture then contacted with the haloethylene, the latter preferably being preheated before being contacted with the other reactants in the reactor.

In carrying out our process we can use the haloethylenes vinyl chloride and vinyl bromide. As a nitrating agent we use dinitrogen tetroxide and for the chlorinating agent the halogens chlorine and bromine.

The reaction is carried out in the vapor phase at temperatures ranging from 225° C. to 350° C., depending primarily upon the haloethylene being treated, the reaction with vinyl bromide taking place at a substantially lower temperature than that required for vinyl chloride.

The ratios of the reactants can be varied somewhat without materially reducing the effectiveness of the reaction. We have found, however, that using vinyl chloride, chlorine and nitrogen dioxide, as the reactants, the preferred mole ratio is of the order of 7.79/0.541/1.0 respectively. We have, however, obtained almost equally satisfactory results when reducing the mole ratio of the chlorine to 0.3.

The halo-2-nitroethanes of our invention are useful as solvents for various purposes and particularly as soil fumigant, being readily sprayed onto or introduced into the soil in the manner and in the amounts customarily employed in soil fumigation.

A better understanding of the nature of our invention can be had by reference to the following examples, which illustrate our invention. We do not intend to be limited to the procedures, amounts and conditions set forth in the examples but we intend for equivalents and variations obvious to those skilled in the art to be included within the scope of this specification and attached claims:

EXAMPLE I

Bromine flowing at a rate of 0.7 g./minute was mixed with dinitrogen tetroxide flowing at a rate of 0.65 g./minute. The resulting mixture was introduced into a reactor maintained at a temperature of 325° C. Vinyl chloride preheated to a temperature of 250° C. was then passed at a rate of 9.75 g./minute into the mixture of dinitrogen tetroxide and bromine in the reactor. The contact time for the reactants was 4.0 seconds. During a period of 150 minutes, 105 grams of bromine (0.937 mole), 97.5 (2.12 moles) of dinitrogen tetroxide and 1462.5 g. (23.4 moles) of vinyl chloride were passed through the reactor. This amounted to a mole ratio of 11.1 vinyl chloride/0.31 bromine/1.0 dinitrogen tetroxide. A yield of 23.8 grams of 2-bromo-1-chloro-nitroethane was obtained based on the vinyl chloride consumed.

EXAMPLE II

This run was made exactly as described in Example I with the exception that the reactants were used in the mole ratio of 2.93 vinyl chloride/0.34 bromine/1.0 dinitrogen tetroxide but the reaction was continued for only 90 minutes.

The reaction product consisted of two layers, the upper aqueous layer weighing 8.2 g. and the lower organic layer weighing 79.3 g. Distillation of the organic layer gave 16 g. of 2-bromo-1-chloro-1-nitroethane, B.P. 68° C. (6.7 mm.), $n_D^{20}$ 1.4970; 1.9 g. of high boiling residue believed to be 4-bromo-1,3-dichloro-1-nitrobutane; 27.4 g. of a liquid believed to be 1,2-dibromo-1-chloroethane; and 27.0 g. of a low boiling unidentified liquid.

EXAMPLE III

The chloronitration of vinyl bromide was carried out as described in Example I above. The mole ratio of the reactants was 9.78 vinyl bromide/2.27 chlorine/1.0 dinitrogen tetroxide. In this case, however, the vinyl bromide was preheated to a temperature of 220° C. and the temperature of the reactor was maintained at 250° C. and the reaction was conducted for a period of 50 minutes. Vacuum distillation of the reaction products gave 18.4 g. of 1-bromo-1-chloro-2-nitroethane, B.P. 54.5° C. (2.0 mm.) from 738.5 g. (6.90 moles) of vinyl bromide, 113.73 g. (1.60 moles) of chlorine and 32.5 g. (0.706 mole) of dinitrogen tetroxide.

EXAMPLE IV

The table which follows shows the results of a series of experiments carried out at different reaction temperatures and using different mole ratios of vinyl chloride, chlorine and dinitrogen tetroxide.

Table

MOLE RATIO AND TEMPERATURE DEPENDENCE OF CONVERSION TO 1,2-DICHLORO-1-NITROETHANE

| Run | Temperature | Mole Ratio, $CH_2=CHCl/Cl_2/NO_2$ | Conv. on percent $CH_2=CHCl$ | Percent On $Cl_2$ | Percent On $NO_2$ |
|---|---|---|---|---|---|
| H20 | 290 | 7.79/.541/1.0 | 2.43 | 34.80 | 18.92 |
| H21 | 300 | 7.79/.541/1.0 | 3.79 | 40.24 | 21.77 |
| H22 | 310 | 7.79/.541/1.0 | 3.30 | 47.52 | 25.71 |
| H23 | 320 | 7.79/.541/1.0 | 3.73 | 53.76 | 29.09 |
| H24 | 330 | 7.79/.541/1.0 | 4.26 | 61.36 | 33.20 |
| H27 | 340 | 7.79/.541/1.0 | 3.14 | 45.20 | 24.46 |
| H28 | 350 | 7.79/.541/1.0 | 2.45 | 35.36 | 19.35 |
| H31 | 330 | 7.79/.541/1.0 | 3.76 | 54.16 | 29.31 |
| H32 | 335 | 7.79/.541/1.0 | 3.71 | 53.44 | 28.92 |
| H33 | 340 | 7.79/.541/1.0 | 3.49 | 50.32 | 27.23 |
| H34 | 345 | 7.79/.541/1.0 | 3.32 | 47.76 | 25.85 |
| H35 | 355 | 7.79/.541/1.0 | 1.74 | 25.04 | 13.56 |
| H37 | 325 | 7.79/.541/1.0 | 4.03 | 58.00 | 31.38 |
| H38 | 330 | 7.79/.541/1.0 | 3.96 | 57.04 | 30.87 |
| H43 | 300 | 7.79/.303/1.0 | 3.02 | 77.71 | 23.55 |
| H44 | 310 | 7.79/.303/1.0 | 3.27 | 84.00 | 25.45 |
| H45 | 320 | 7.79/.303/1.0 | 3.38 | 87.00 | 26.36 |
| H47 | 340 | 7.79/.303/1.0 | 3.49 | 89.86 | 27.23 |
| H48 | 300 | 7.79/.6/1.0 | 4.25 | 47.28 | 23.15 |
| H49 | 310 | 7.79/.6/1.0 | 4.80 | 54.32 | 38.09 |
| H50 | 320 | 7.79/.6/1.0 | 4.72 | 52.47 | 36.80 |
| H51 | 330 | 7.79/.6/1.0 | 3.73 | 41.48 | 29.09 |
| H52 | 340 | 7.79/.6/1.0 | 2.48 | 27.59 | 19.35 |
| H53 | 310 | 7.79/.303/1.0 | 3.07 | 78.75 | 23.90 |
| H54 | 320 | 7.79/.303/1.0 | 3.55 | 92.55 | 28.05 |
| H55 | 330 | 7.79/.303/1.0 | 3.48 | 89.43 | 27.10 |
| H56 | 330 | 7.79/.303/1.0 | 4.14 | 106.57 | 32.29 |
| H57 | 335 | 7.79/.303/1.0 | 3.95 | 101.71 | 30.82 |

From the above it can be seen that the highest conversion based on vinyl chloride was 4.89% in run H49. The highest conversion based on chlorine was 106.57% in run H56 and the highest on dinitrogen tetroxide was 38.09% in run H49. The most readily controlled reactions were those at mole ratios of 7.79/0.54/1.0 at 325° C.

Now having described our invention, what we claim is:

1. In a process for the halonitration of halogenated ethylenes, the step which comprises reacting in the vapor phase a material selected from the group consisting of chlorinated ethylenes and brominated ethylenes with dinitrogen tetroxide and a halogen selected from the group consisting of bromine and chlorine, the reaction temperature with the chlorinated ethylenes being within the range of 300–350° C. and with the brominated ethylenes between 225° and 275° C.

2. The process of claim 1 wherein said halonitration is effected using for each mole of dinitrogen tetroxide from 1 to 20 moles of halogenated ethylenes and from 1.0 to 5.0 moles of halogen.

3. The process of claim 1 wherein said halogenated ethylenes are passed into a mixture of dinitrogen tetroxide with the desired halogen.

4. The process of claim 3 wherein the halogenated ethylenes are preheated prior to introduction into the mixture of dinitrogen tetroxide and halogen.

5. In a process for the production of 2-bromo-1-chloronitroethane by the halonitration of vinyl chloride, the step which comprises passing preheated vinyl chloride into a mixture of dinitrogen tetroxide and bromine, said mixing being effected in the vapor phase at a temperature of approximately 325° C.

6. In a process for the production of 2-bromo-1-chloronitroethane by the halonitration of vinyl chloride, the step which comprises passing preheated vinyl chloride into a mixture of dinitrogen tetroxide and bromine while maintaining the reaction mixture in the vapor phase at a temperature of approximately 250° C.

7. In a process for the production of 1-bromo-1-chloro-2-nitroethane, the step which comprises passing preheated vinyl bromide into a mixture of dinitrogen tetroxide and chlorine while maintaining the reaction mixture in the vapor phase at a temperature of approximately 250° C.

8. In a process for the production of 1,2-dichloro-1-nitroethane, the step which comprises passing preheated vinyl chloride into a mixture of dinitrogen tetroxide and chlorine while maintaining the reaction mixture in the vapor phase at a temperature ranging from 300 to 350° C.

References Cited in the file of this patent

UNITED STATES PATENTS 2,597,698    Bachman et al. _____ May 20, 1952

FOREIGN PATENTS 58,977    Netherlands _____ Feb. 15, 1947

OTHER REFERENCES

Sidgwick: "The Chemical Elements and Their Compounds," vol. I, page 688 (1950), Oxford.

Stevens et al.: "J.A.C.S.," 80, 338–39, January 20, 1958.